(12) United States Patent
Fairbanks

(10) Patent No.: US 6,888,383 B1
(45) Date of Patent: May 3, 2005

(54) OPEN LOOP LED DRIVER SYSTEM

(75) Inventor: John Patrick Fairbanks, Roseville, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/657,393

(22) Filed: Sep. 8, 2003

(51) Int. Cl.$^7$ .............................................. H03K 17/00

(52) U.S. Cl. ....................................... 327/124; 327/530

(58) Field of Search ................................. 327/124, 131, 327/132, 133, 134, 135, 136, 137, 138, 139, 530, 534, 540, 548

(56) References Cited

U.S. PATENT DOCUMENTS

| | | | | |
|---|---|---|---|---|
| 4,618,812 A | * | 10/1986 | Kawakami | 323/224 |
| 5,736,881 A | * | 4/1998 | Ortiz | 327/175 |
| 6,697,402 B2 | * | 2/2004 | Crawford | 372/38.03 |
| 6,753,723 B2 | * | 6/2004 | Zhang | 327/540 |

OTHER PUBLICATIONS

"LM2623 Ratio Adaptive, Gated Oscillator Cookbook," *National Semiconductor Corporation*, Apr. 2002 (5 pages).
"LM2623 Ratio Adaptive Gated Oscillator Based, DC DC Boost Converter–Low Vin, Low Ripple, General Purpose," *National Semiconductor Corporation*, Nov. 2002 (11 pages).

* cited by examiner

*Primary Examiner*—Jeffrey Zweizig
(74) *Attorney, Agent, or Firm*—Merchant & Gould P.C.; Brett A. Hertzberg

(57) ABSTRACT

A switching regulator circuit is arranged to provide a constant current to a load. The switching regulator circuit is operated in discontinuous current mode such that an inductor stores energy in a first part of an oscillation cycle, and discharges in a second part of the cycle. The trigger mechanism for the oscillator is disabled when the charged inductor couples energy to the load, and enabled after the inductor is detected as discharged. The energy stored in the inductor is proportional to the square of the on-time associated with switching regulator. Constant voltage load devices such as LEDs for a display can be driven by the switching regulator in an open-loop mode such that the current in the load devices is a linear function of the on-time.

20 Claims, 3 Drawing Sheets

US 6,888,383 B1

OPEN LOOP LED DRIVER SYSTEM

FIELD OF THE INVENTION

The present invention is related to switching regulators. More particularly, the present invention is related to a circuit that provides a constant current to a load using an open-loop operation of a switching regulator.

BACKGROUND OF THE INVENTION

Demand for portable electronic devices is increasing each year. Example portable electronic devices include: laptop computers, personal data assistants (PDAs), cellular telephones, and electronic pagers. Portable electronic devices place high importance on total weight, size, and battery life for the devices. Many portable electronic devices employ rechargeable batteries such as Nickel-Cadmium (NiCad), Nickel-Metal-Hydride (NiMHi), Lithium-Ion (Li-Ion), and Lithium-Polymer based technologies.

In many portable power applications, a voltage that exceeds the battery voltage is required to operate certain circuits such as a video display. DC—DC converters are switching-type regulators that can be used to generate higher output voltages from a battery voltage. The output voltage is typically provided to a load circuit by varying the conduction time that is associated with a controlled device. Example controlled devices include transistors, gate-turn-on (GTO devices), thyristors, diodes, as well as others The frequency, duty cycle, and conduction time of the controlled device is varied to adjust the average output voltage to the load. Typical DC—DC converters are operated with some sort of oscillator circuit that provides a clock signal. The output voltage of the converter is also determined by the oscillation frequency associated with the clock signal.

BRIEF DESCRIPTION OF THE DRAWINGS

Non-limiting and non-exhaustive embodiments of the present invention are described with reference to the following drawings.

DETAILED DESCRIPTION OF THE PREFERRED EMBODIMENT

Figure 1:
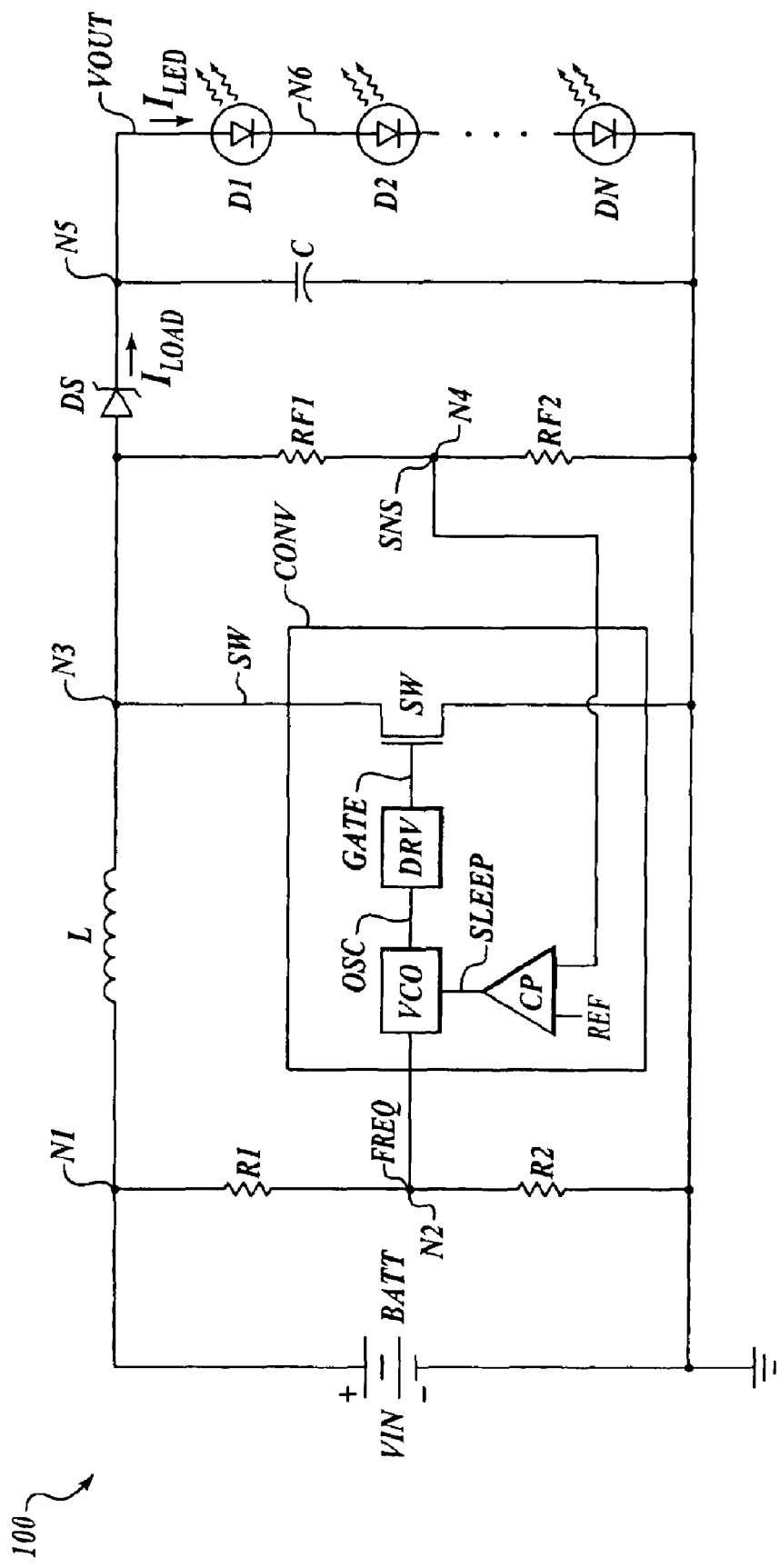
FIG. 1 is an illustration of a schematic diagram for a circuit that is arranged according to an embodiment of the present invention.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meaning of "a," "an," and "the" includes plural reference. The meaning of "in" includes "in" and "on." The term "connected" means a direct connection between the items connected, without any intermediate devices. The term "coupled" refers to both direct connections between the items connected, and indirect connections through one or more intermediary items. The term "circuit" may refer to both single components, and to a multiplicity of components. The term component refers to one or more items that are configured to provide a desired function. The term "signal" includes signals such as currents, voltages, charges, logic signals, data signals, optical signals, electromagnetic waves, as well as others. Referring to the drawings, like numbers indicate like parts throughout the views.

Briefly stated, the present invention is related to a switching regulator circuit arranged to provide a constant current to a load. The switching regulator circuit is operated in discontinuous current mode such that an inductor stores energy in a first part of an oscillation cycle, and discharges in a second part of the cycle. The trigger mechanism for the oscillator is disabled when the charged inductor couples energy to the load, and enabled after the inductor is detected as discharged. The energy stored in the inductor is proportional to the square of the on-time associated with switching regulator. Constant voltage load devices such as LEDs for a display can be driven by the switching regulator in an open-loop mode such that the current in the load devices is a linear function of the on-time.

FIG. 1 is an illustration of a schematic diagram for a circuit (100) that is arranged according to an embodiment of the present invention. The circuit (100) includes a battery (BATT), four resistors (R1, R2, RF1, RF2), an inductor (L), a capacitor (C), a diode (DS), a load circuit that is represented as a number (N) of LEDs (D1–DN), and a converter circuit (CONV). The diode (DS) is illustrated as a Schottky-type diode.

Battery BATT is coupled between node N1 and ground. Inductor L is coupled between node N1 and N3. Resistor R1 is coupled between node N1 and node N2. Resistor R2 is coupled between node N2 and ground. Resistor RF1 is coupled between node N3 and node N4. Resistor RF2 is coupled between node N4 and ground. Diode DS is coupled between node N3 and node N5. Capacitor C is coupled between node N5 and ground. LEDs D1–DN are coupled between node N5 and ground. Converter circuit CONV is coupled to nodes N2, N3, and N4. The battery (BATT) is arranged to provide an input voltage (VIN) at node N1. Resistors RF1 and RF2 form a voltage divider that is arranged to provide a sensed voltage (SNS) at node N4.

The converter circuit (CONV) includes a voltage controlled oscillator circuit (VCO), a driver circuit (DRV), a switch circuit (SW), and a comparator (CP). The VCO circuit is responsive to a signal (FREQ) from node N2. The output of the VCO circuit is an oscillation signal (OSC). The driver circuit (DRV) is arranged to receive the oscillation signal (OSC) and provide a gate control signal (GATE). The gate control signal (GATE) is coupled to a control terminal of the switch circuit (SW). The switch circuit is arranged to couple node N3 (the SW terminal) to ground when activated in response to the gate control signal (GATE) such that the inductor (L) is periodically charged. Comparator CP is arranged to deactivate the oscillator signal with a SLEEP signal whenever the sense voltage (SNS) exceeds a predetermined reference level (REF). By gating the VCO circuit with the SLEEP signal, the oscillation signal is forced into a known operating condition (e.g., a logic 1 or logic 0). The sense voltage (SNS) is associated with a switch pin for the converter (e.g., node N3). The switch circuit (SW) will be deactivated when the VCO circuit is gated off such that the inductor will completely discharge.

Although, the load circuit is illustrated as an array of LEDs, any load that draws a relatively constant current can be arranged for operation with the converter. The circuit illustrated in FIG. 1 draws relatively constant power from the battery with high efficiencies as will be described. Resistor R1 is arranged to provide current to the VCO to adjust the pulse width of the oscillation signal (OSC), while resistor R2 is arranged to shunt current to ground to provide a DC offset for the VCO control terminal.

Figure 2:
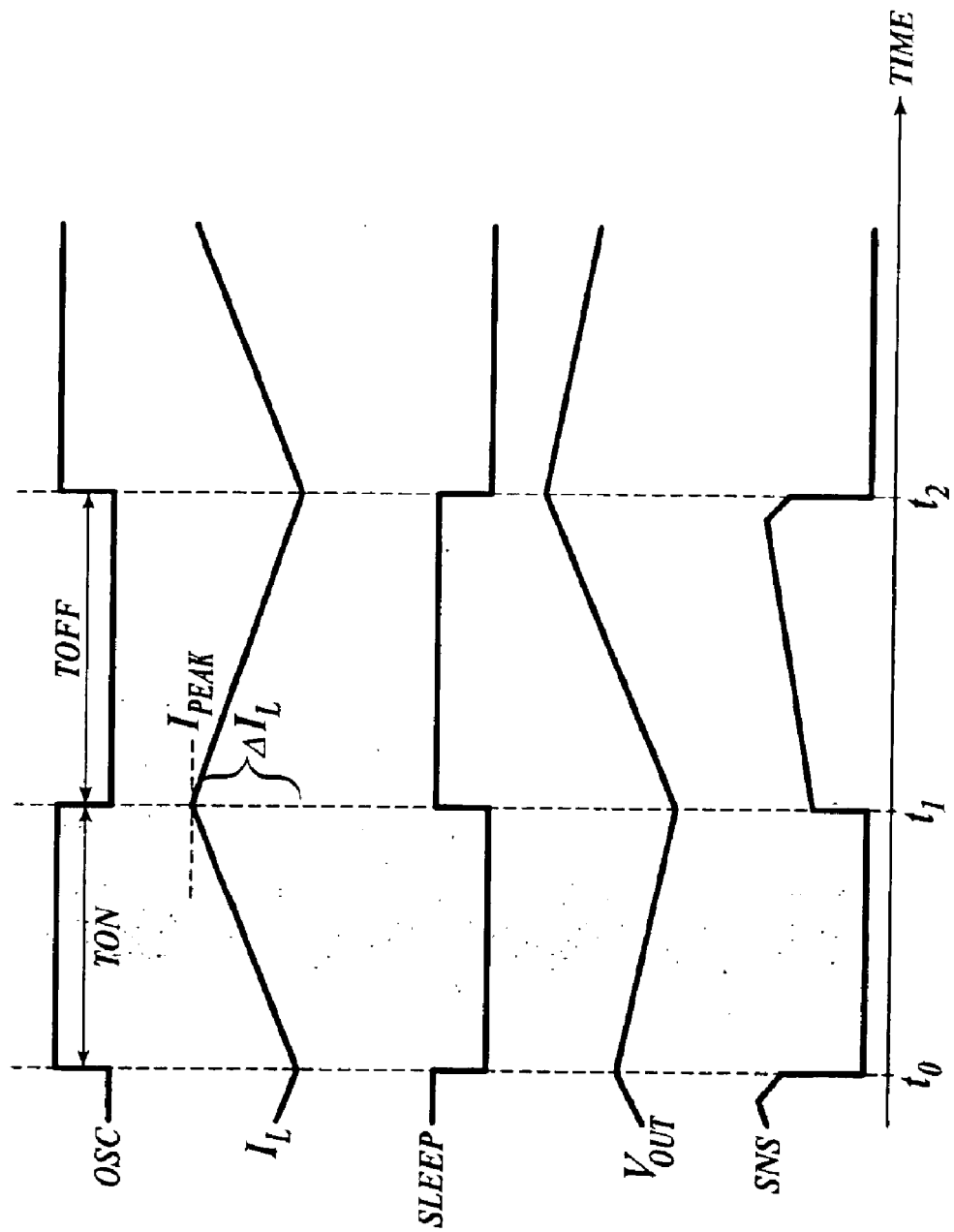
FIG. 2 is an illustration of a timing schematic diagram for a circuit that is arranged according to an embodiment of the present invention.

The switching regulator circuit illustrated in FIG. 1 is operated in a discontinuous current mode as illustrated in FIG. 2. At time t0, the inductor (L) is in a completely discharged state such that it has no stored energy. Since the sense voltage (SNS) is below the reference level (REF), the VCO circuit will be activated to provide an oscillation signal (OSC). The oscillation signal causes the switch circuit (SW) to close such that the inductor (L) is coupled between nodes N1 and ground. The period of time where the switch circuit (SW) is closed is related to the pulse width (TON) of the oscillation signal (OSC). The inductor (L) will charge while the switch circuit is activated such that the change in current flow (AIL) through the inductor is given by: $\Delta I_L = VIN * \Delta t / L$.

At time t1, the oscillation signal (OSC) pulse ends and the switch circuit (SW) opens. The switch circuit will remain in the open circuit position over a time interval from t1 to t2 where the oscillation signal is deasserted (TOFF). The energy stored in the inductor (L) is delivered to the load circuit via the diode (DS) during the TOFF interval. The output voltage (VOUT) increases while the inductor delivers energy to the load circuit. The voltage node N3 will instantaneously increase from the ground potential to VOUT+V (DS) when the switch circuit (SW) is deactivated (open circuit) at time t1. Similarly, the sense voltage (SNS) at node N4 will instantaneously increase when the switch circuit (SW) is deactivated at time t1. From time t1 through t2 the sense voltage (SNS) will increase proportional to the output voltage (VOUT) according to the scaling factor set by resistors RF1 and RF2. The SLEEP signal is activated at time t1 since the sense voltage (SNS) is above the reference voltage (REF) in the converter.

At time t2, the current (IL) in the inductor (L) drops to zero and the diode is no longer forward biased. Once the diode becomes inactive, the voltage at nodes N3 and N4 (the sense voltage) collapse resulting in the deactivation of the SLEEP signal. Once the SLEEP signal is deactivated, the oscillator resumes operation as illustrated in FIG. 2.

The pulse width (TON) of the oscillation signal is controlled via signal FREQ at node N2. In one example, the signal FREQ corresponds to a control voltage that is determined by the input voltage (VIN) and a voltage divider that is formed by resistors R1 and R2. In another example, the signal FREQ corresponds to a current that is set by the value of resistor R1 and the input voltage (VIN), where resistor R2 is arranged to shunt current to ground to provide a DC offset for the control terminal of the VCO. In each example, signal FREQ is proportional to the input voltage (VIN) such that the pulse width of the oscillation signal (TON) is also proportional to the input voltage (VIN).

As described previously, the VCO circuit is deactivated or disabled such that the oscillation signal is static (e.g., a logic 0 or a logic 1) when the SLEEP signal is asserted. The SLEEP signal is asserted (or activated) when the sense voltage (SNS) reaches a predetermined reference voltage (REF) in the converter (CONV). In one example, the reference voltage corresponds to a band-gap voltage (e.g., 1.2V) that is provided by a band-gap voltage reference circuit. Resistors RF1 and RF2 operate as a voltage divider that scales the value of the voltage at node N3 for comparison to the reference voltage (REF) as the sense voltage (SNS). The values associated with resistors RF1 and RF2 are chosen to select the appropriate regulation limit where the VCO circuit will once again be enabled. Just prior to time t2, the voltage at node N3 sags as the inductive coil (L) discharges its stored energy. At time t2, the sense voltage (SNS) drops sufficient to indicate that the inductor (L) has discharged approximately all of its stored energy. Since the coil completely discharges before the next cycle, the off time (TOFF) will vary proportional to the on time (TON).

Inductor (L) is arranged to store energy in the first part of the conduction cycle (TON) and discharges in the second part of the conduction cycle (TOFF). The energy stored in the inductor (L) is equal to half of the inductance times the peak current squared. The peak current ($I_{PK}$) is determined by the on-time ($T_{ON}$), the input voltage ($V_{IN}$), and the inductance as follows below.

$$I_{PEAK} = T_{ON} * V_{IN} / L \qquad \text{(Eq. 1)}.$$

The stored energy in the inductor is thus proportional to the on-time (TON) squared (e.g., see Eq. 4). The average power consumed by the switching regulator circuit is equal to the energy consumed divided by time. The total time of one switching cycle includes the on-time (or energy storage time) and the off-time (or discharge time). The off-time and the on-time are linearly related to one another as follows below.

$$T_{OFF} = T_{ON} * V_{IN} / (V_{OUT} - V_{IN}) \qquad \text{(Eq. 2)}.$$

When the input and output voltages are known, the total time period ($T_{ON} + T_{OFF}$) of the switching regulator is a linear function of the on-time, as follows below.

$$\begin{aligned} \text{Period} &= [T_{ON} * V_{IN} / (V_{OUT} - V_{IN})] + T_{ON} \qquad \text{(Eq. 3)} \\ &= T_{ON} * [V_{IN} / (V_{OUT} - V_{IN}) + 1] \\ &= T_{ON} * V_{OUT} / (V_{OUT} - V_{IN}) \end{aligned}$$

When VIN and VOUT are assumed to be constant, the power consumption is a linear function of the on-time that corresponds to a constant (K1) times the on-time squared ($T_{ON}^2$) divided by another constant (K2) times the on-time ($T_{ON}$). For a constant voltage load such as light emitting diodes (LEDs) the current consumption predictably corresponds to a linear function of the on-time.

The VCO circuit in the converter has a linear response with respect to the input voltage (VIN) and the oscillation frequency. The on-time decreases linearly as the input voltage increases. The oscillation frequency can be arranged such that decreases in on-time reduces the power consumption at the same rate that the increased voltage increases the power consumption such that a constant power output circuit (constant current) results. For a constant power output circuit, the relationship between input voltage (VIN), output voltage (VOUT), and power consumption (Power) are determined as follows below.

$$\text{Energy Stored Per Cycle} = \frac{1}{2} * L * I_{PEAK}^2 \qquad \text{(Eq. 4)}$$

-continued

Power = Energy Stored Per Unit Time (Eq. 5)

Substituting Eq. 4 into Eq. 5 yields:

$$\text{Power} = \frac{1}{2} * L * I_{PEAK}^2 / \text{Period} \quad \text{(Eq. 6)}$$

Substituting Eqs. 1 and 3 into Eq. 5 yields:

$$\text{Power} = \frac{1}{2} * L * (T_{ON} * V_{IN}/L)^2 / [T_{ON} * V_{OUT}/(V_{OUT} - V_{IN})] \quad \text{(Eq. 7)}$$

$$= (T_{ON} * V_{in}^2/2L)/(V_{OUT}/(V_{OUT} - V_{IN}))$$

$$= T_{ON} * Vin^2 * (V_{OUT} - V_{IN})/(2L * V_{OUT})$$

The VCO oscillation frequency is linearly related to the input voltage (VIN), where the oscillation frequency intersects the voltage axis at a point corresponding to voltage X (e.g., 1 volt). Since the oscillation frequency adjustment also corresponds to the adjustment of the oscillation signal (OSC) pulse width ($T_{ON}$), the pulse width is related to the input voltage by:

$$T_{ON} = K/(V_{IN} - X)). \quad \text{(Eq. 8)}$$

Substituting Eq. 8 into Eq. 7 yields:

$$\text{Power} = (K/2L) * (V_{IN}^2/V_{OUT}) * (V_{OUT} - V_{IN})/(V_{IN} - X) \quad \text{(Eq. 9)}.$$

Vdiff corresponds to the voltage difference between the input voltage ($V_{IN}$) and the output voltage ($V_{OUT}$) that is provided by the operation of the converter circuit. The current that is delivered to the load circuit (e.g., the array of LEDs) is determined by the ratio of Power and Vdiff, as given by:

$$\text{Load Current} = \text{Power}/(V_{OUT} - V_{IN}) \quad \text{(Eq. 10)}$$

$$= (K/2L) * (V_{IN}^2/V_{OUT})/(V_{IN} - X) \quad \text{(Eq. 11)}$$

Figure 3:
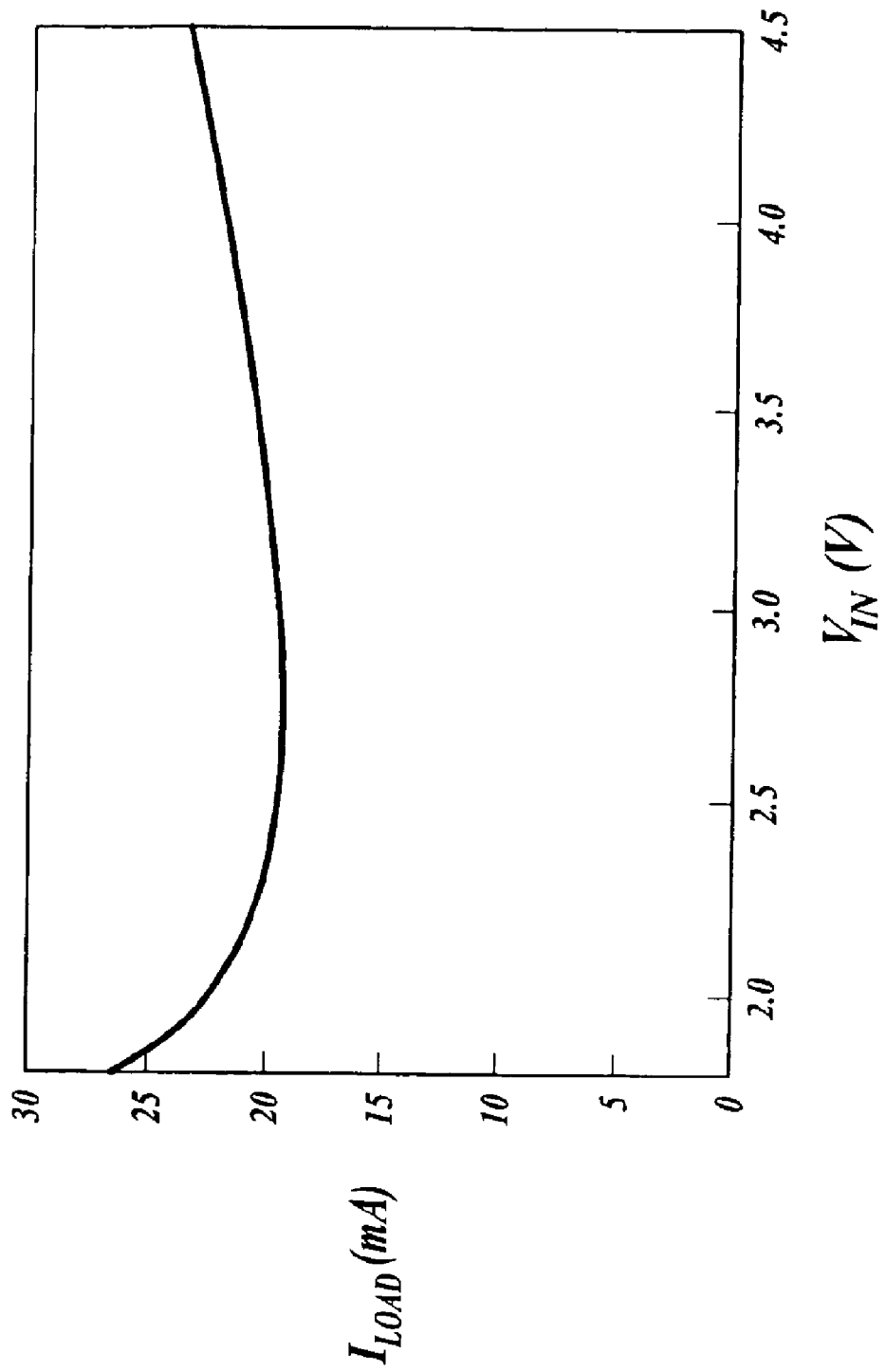
FIG. 3 is an illustration of a plot related to a circuit that is arranged according to an embodiment of the present invention.

FIG. 3 is an illustration of a plot related to a circuit that is arranged according to an embodiment of the present invention. As shown in FIG. 3, the load current ($I_{LOAD}$) is related to the input voltage ($V_{IN}$) according to a substantially linear relationship over the range of input voltages (VIN) from 2.8V through 4.5V. Typical efficiencies that are achieved according to the present invention are on the order of 80% to 90%.

The operation of the above-described converter in discontinuous mode is simple and inexpensive relative to conventional LED driver systems. The discontinuous current mode is arranged to generate a relatively constant power level. Since the load circuit is a relatively constant voltage load, the constant power level provides a constant current circuit. Increased input voltages results in reductions in the oscillator on-time such that the constant current draw is independent of input voltage. By careful selection of the oscillator on time variations with the load circuit voltage variations, the circuit is a constant current circuit that is independent of voltage and temperature.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A switching regulator that is arranged to provide current to a load circuit, comprising:
   a first resistor that is coupled between a first node and a second node, wherein the first node is associated with an input voltage;
   a second resistor that is coupled between the second node and a circuit ground;
   an inductor that is coupled between the first node and a third node;
   a third resistor that is coupled between the third node and a fourth node;
   a fourth resistor that is coupled between the fourth node and the circuit ground;
   a diode that is coupled between the third node and the load circuit;
   a capacitor that is coupled in parallel with the load circuit;
   a switch circuit that is arranged to selectively couple the third node to the circuit ground in response to a pulsed gate signal; and
   a voltage controlled oscillator that is responsive to a frequency signal from the third node and arranged to provide a pulsed gate signal, wherein the voltage controlled oscillator is: disabled by a first signal from the fourth node when the first signal is above a predetermined reference level, enabled when the first signal is below the predetermined reference level, and arranged to provide the pulsed gate signal when enabled such that the switch circuit is activated for a time interval that is associated with a pulse width that is determined by a second signal from the second node.

2. The switching regulator of claim 1, wherein the voltage controlled oscillator is arranged to adjust the pulse width by sensing a second voltage that is associated with the second signal, where the second voltage is related to the input voltage according to a voltage divider that is formed by the first and second resistors.

3. The switching regulator of claim 1, wherein the voltage controlled oscillator is arranged to adjust the pulse width by sensing a second current that is associated with the second signal, where the second current is related to the input voltage by a first value that is associated with the first resistor.

4. The switching regulator of claim 1, wherein the first signal corresponds to a first voltage that is provided by a voltage divider that is formed by the third and fourth resistors.

5. The switching regulator of claim 1, further comprising a comparator circuit that is arranged to disable the voltage controlled oscillator when the first signal exceeds the predetermined reference level.

6. The switching regulator of claim 1, wherein the predetermined reference level corresponds to a band-gap voltage.

7. The switching regulator of claim 1, wherein a third voltage associated with the third node: corresponds to a ground potential when the switch circuit is activated, is related to the output voltage when the switch circuit is deactivated and the inductor is discharging, and collapses towards the ground potential when the inductor is discharged.

8. The switching regulator of claim 7, wherein the first signal corresponds to a scaled version of the third voltage, where a scaling factor associated with the scaled version is determined by the third and fourth resistors.

9. The switching regulator of claim 1, wherein the diode is a Schottky-type diode.

10. The switching regulator of claim 1, wherein the load circuit comprises an array of light emitting diodes that are coupled together to operate as a constant voltage load.

11. A switching regulator that is arranged to generate an output voltage ($V_{OUT}$) from an input voltage ($V_{IN}$) by coupling a current ($I_{LOAD}$) to a load circuit, the switching regulator comprising:

an inductor that is coupled between a first node and a second node, wherein the first node is associated with the input voltage, wherein the inductor has a value that corresponds to L;

a diode that is coupled between the second node and the load circuit;

a sense means that is arranged to monitor a sense voltage from the second node;

an oscillator means that is arranged to selectively provide a gate signal when enabled, wherein a pulse width associated with the gate signal is responsive to the input voltage ($V_{IN}$);

a switch means that is arranged to selectively couple the second node to a circuit ground when the gate signal is asserted; and a disable means that is arranged to disable the oscillator means in response to the sense voltage when the inductor is discharging until the sense voltage collapses below a predetermined reference level such that the switching regulator is operated in a discontinuous current node.

12. The switching regulator of claim 11, wherein the switching regulator is arranged such that an off-tune ($T_{OFF}$) and an on-time ($T_{ON}$) associated with the switch means are linearly related to one another according to: $T_{OFF}=T_{ON}*V_{IN}/(V_{OUT}-V_{IN})$.

13. The switching regulator of claim 11, wherein the switching regulator is arranged such that a period associated with the switching regulator is determined by: Period= $T_{ON}*V_{OUT}/(V_{OUT}-V_{IN})$, wherein $T_{ON}$ is associated with the pulsed gate signal.

14. The switching regulator of claim 11, wherein the switching regulator is arranged such that the current ($I_{LOAD}$) that is provided to the load circuit is given by: $I_{LOAD}=(K/2L)*(V_{IN}^2/V_{OUT})/(V_{IN}-X)$, where K is a constant and X is an intercept value associated with a linear relationship between pulse width and input voltage.

15. The switching regulator of claim 11, wherein the switching regulator is arranged such that the pulse width of the gate signal linearly decreases with increased values of input voltage.

16. The switching regulator of claim 11, wherein the switching regulator is arranged such that decreases in the pulse width reduces power consumption of the switching regulator at the same rate that the input voltage increases such that the switching regulator operates as a constant power output circuit.

17. A method of generating an output voltage ($V_{OUT}$) for a load circuit from an input voltage ($V_{IN}$) with a switching regulator, the method comprising:

coupling an inductor to a circuit ground such that the inductor is charged during a first cycle, wherein the inductor has a value corresponding to L;

discharging the inductor after the first cycle by coupling energy from the inductor to the load circuit through a diode during a second cycle, wherein the second cycle is different from the first cycle;

sensing when the inductor is discharged;

restarting the first cycle when the inductor is determined to be discharged such that the switching regulator is operated in a discontinuous current rode; and adjusting the period associated with the first cycle in response to the input voltage ($V_{IN}$) such that a load current that is provided to the load circuit is a linear function of the input voltage ($V_{IN}$).

18. The method of claim 17, wherein sensing when the inductor is discharged corresponds to: monitoring a voltage associated with the inductor to determine when the inductor is discharged, and comparing the monitored voltage to a predetermined reference level.

19. The method of claim 17, wherein adjusting the period associated with the first cycle comprises: linearly decreasing the period associated with the first cycle when the input voltage increases, and linearly increasing the period associated with the first cycle when the input voltage decreases.

20. The method of claim 17, further comprising: adjusting a current ($I_{LOAD}$) that is provided to the load circuit according to: $I_{LOAD}=(K/2L)*(Vin^2/Vo)/(Vin-X)$, where K is a constant and X is art intercept value associated with a linear relationship between pulse width and input voltage.

* * * * *

UNITED STATES PATENT AND TRADEMARK OFFICE
CERTIFICATE OF CORRECTION

PATENT NO. : 6,888,383 B1
DATED : May 3, 2005
INVENTOR(S) : Fairbanks

It is certified that error appears in the above-identified patent and that said Letters Patent is hereby corrected as shown below:

Column 3,
Line 24, "(AIL)" should read -- ($\Delta I_L$) --.

Column 7,
Line 31, "such that an off-tune" should read -- such that an off-time --.

Column 8,
Line 24, "current rode" should read -- current mode --.
Line 43, "X is art intercept" should read -- X is an intercept --.

Signed and Sealed this

Fourth Day of October, 2005

JON W. DUDAS
*Director of the United States Patent and Trademark Office*